US012564818B2

(12) United States Patent
Wu et al.

(10) Patent No.: US 12,564,818 B2
(45) Date of Patent: Mar. 3, 2026

(54) PREPARATION METHOD FOR HIGH-MOISTURE- PERMEABILITY FLUORINE-CONTAINING SUPER-OLEOPHOBIC MICROPOROUS MEMBRANE

(71) Applicants: Shanghai Hyproof Technology Co., Ltd., Shanghai (CN); Shanghai Hyproof New Material Technology Co., Ltd, Shanghai (CN)

(72) Inventors: Huisheng Wu, Shanghai (CN); Ying Yang, Shanghai (CN); Rongrong Hao, Shanghai (CN)

(73) Assignees: Shanghai Hyproof Technology Co., Ltd., Shanghai (CN); Shanghai Hyproof New Material Technology Co., Ltd, Shanghai (CN)

( * ) Notice: Subject to any disclaimer, the term of this patent is extended or adjusted under 35 U.S.C. 154(b) by 339 days.

(21) Appl. No.: 18/276,055

(22) PCT Filed: Dec. 16, 2021

(86) PCT No.: PCT/CN2021/138840
§ 371 (c)(1),
(2) Date: Aug. 7, 2023

(87) PCT Pub. No.: WO2022/166430
PCT Pub. Date: Aug. 11, 2022

(65) Prior Publication Data
US 2024/0123411 A1 Apr. 18, 2024

(30) Foreign Application Priority Data
Feb. 7, 2021 (CN) .......................... 202110170098.5

(51) Int. Cl.
*B01D 71/36* (2006.01)

(52) U.S. Cl.
CPC ........ *B01D 71/36* (2013.01); *B01D 2323/081* (2022.08); *B01D 2325/02* (2013.01); *B01D 2325/04* (2013.01); *B01D 2325/20* (2013.01); *B01D 2325/42* (2013.01)

(58) Field of Classification Search
None
See application file for complete search history.

(56) References Cited

FOREIGN PATENT DOCUMENTS

| CN | 103459005 A | 12/2013 |
|---|---|---|
| CN | 106977640 A | 7/2017 |
| CN | 107216431 A | 9/2017 |
| CN | 107325238 A | 11/2017 |
| CN | 107353374 A | 11/2017 |
| CN | 112920532 A | 6/2021 |
| CN | 112980118 A | 6/2021 |
| CN | 113150333 A | 7/2021 |
| EP | 0037745 A1 | 10/1981 |

OTHER PUBLICATIONS

Donggao Li, Intermolecular Perforation-based Moisture Permeability and Moisture Permeability Mechanisms of Hydrophilic Groups, pp. 316-317.

*Primary Examiner* — Krishnan S Menon
(74) *Attorney, Agent, or Firm* — Bayramoglu Law Offices LLC

(57) ABSTRACT

A preparation method of a high-moisture-permeability fluorine-containing super-oleophobic microporous membrane is provided having the following steps: (1) preparing a white opaque mixture of fluorine-containing polymers: adding the materials in sequence according to a weight ratio of A50%~90%:B3%~25%:C0%~35%:D0%~3%, and stirring and mixing uniformly in a non-shear manner; A is a blend of a high molecular weight polytetrafluoroethylene dispersion resin and a fluorine-containing ion exchange resin; B is a fluorine-containing alkyl acrylate monomer, or a fluorine-containing alkyl methacrylate monomer, or a mixture thereof; C is a polyurethane acrylate prepolymer, or a fluorine-free alkyl acrylate monomer, or a mixture thereof; D is a high temperature free radical initiator; (2) pouring the white opaque mixture into the blank pressing column barrel, and pressing a blank; (3) calendering into strips; (4) stretching and thermally shaping to form a membrane.

11 Claims, No Drawings

PREPARATION METHOD FOR HIGH-MOISTURE- PERMEABILITY FLUORINE-CONTAINING SUPER-OLEOPHOBIC MICROPOROUS MEMBRANE

CROSS REFERENCE TO THE RELATED APPLICATIONS

This application is a national stage entry of International Application No. PCT/CN2021/138840, file on Dec. 16, 2021, which is based upon and claims priority to Chinese Patent Application No. 202110170098.5, filed on Feb. 7, 2021, the entire contents of which are incorporated herein by reference.

TECHNICAL FIELD

The invention relates to a polymer material, more specifically, a method for preparing a novel high-moisture-permeability fluorine-containing super-oleophobic microporous membrane.

BACKGROUND

Fluorine-containing polymers, especially homopolymerized, modified, or copolymerized resins of tetrafluoroethylene have excellent physical and mechanical properties and chemical stability, and are widely used in various fields such as chemical materials, mechanical electronics, aerospace, military protection, new materials and new energy, etc. After high-molecular-weight polytetrafluoroethylene dispersion resin with lubricating oil are mixed, pressed into a paste state, extruded, deoiled, stretched in one direction or two directions, and finally shaped to obtain expanded polytetrafluoroethylene with microporosity and air permeability. Due to its special properties, the material has become a functional fluorine-containing microporous polymer material for high-end applications, such as environmental filtration, protective clothing fabrics, medical devices, electronic materials and sealing insulation materials, etc.

Expanded polytetrafluoroethylene is a fluorine-containing microporous polymer material with a highly microporous structure, excellent physical and chemical properties, mechanical properties, waterproof, air permeability and chemical stability, and has been used to manufacture wires and cables insulation materials, medical equipment, sealing materials, environmental protection filtration and clothing fabrics, etc. since the 1970s. In the industry, high-purity (>99.99%) tetrafluoroethylene monomer is usually used to polymerize or copolymerize through dispersion polymerization to prepare dispersed resin. The materials used to prepare expanded PTFE are generally tetrafluoroethylene homopolymer dispersion or modified resin with an ultra-high molecular weight and high crystallinity, usually through paste pressing, extrusion, deoiling, and then Stretching in one way or two ways, finally shaping, and making expanded fluorine-containing microporous membrane material, but this kind of microporous membrane is easily polluted by oil and loses its water resistance. In addition, the lubricating oil used is flammable and explosive during the deoiling process, which is easily to cause industrial safety and hidden danger.

SUMMARY

Due to the above-mentioned problems in the prior art, the present application provides a preparation method of a high-moisture-permeability fluorine-containing super-oleophobic microporous membrane, and the purpose is aiming to solve the problems of complicated preparation process and hidden safety risks of the existing microporous membrane.

In order to achieve the above technical problems, the application adopts the following technical solutions:

A preparation method of a high-moisture-permeability fluorine-containing super-oleophobic microporous membrane, the preparation method comprises the following steps:

(1) preparing a white opaque mixture of fluorine-containing polymers: adding the materials in sequence according to a weight ratio of A50%~90%:B3%~25%: C0%~35%:D0%~3%, and stirring and mixing uniformly in a non-shear manner; wherein:

A is a blend of a high molecular weight polytetrafluoroethylene dispersion resin and a fluorine-containing ion exchange resin; wherein a dry weight ratio of fluorine-containing ion exchange resin/high molecular weight polytetrafluoroethylene dispersion resin is 0.5%-10%;

B is a fluorine-containing alkyl acrylate monomer, or a fluorine-containing alkyl methacrylate monomer, or a mixture of monomers thereof; its molecular weight is less than 3000, and its melting point is below 80° C.;

C is a polyurethane acrylate prepolymer, or a fluorine-free alkyl acrylate monomer, or a mixture thereof; its molecular weight is less than 8000, and its melting point is below 80° C.;

D is a high temperature free radical initiator;

(2) pouring the white opaque mixture of fluorine-containing polymers directly into the blank pressing column barrel, and press the blank at 20° C. to 100° C. after air-exhausting to prepare a cylindrical pasty mixture blank column;

(3) extruding the pasty mixture blank column through a pusher at 20° C.-100° C., and then calendering the paste extrudate into strips with a thickness of 50-2000 microns;

(4) stretching the strips unidirectionally or biaxially at 100° C. to 200° C., and finally thermally shaping at 200° C. to 390° C. to make the high-moisture-permeability fluorine-containing super-oleophobic microporous membrane.

Preferably, the composition of the white opaque mixture of fluorine-containing polymers is A65%-80%:B6%-15%: C2%-23%:D0-2% by a weight ratio.

Preferably, the thickness of the high-moisture-permeability fluorine-containing super-oleophobic microporous membrane is about 0.005-1.5 mm; the membrane weight is about 1-1200 g/m$^2$; the porosity is about 30-95%; the initial oil resistance of the membrane surface is at least Grade 5; the tensile strength of the membrane is greater than 20 MPa, the moisture permeability of the membrane is greater than 10,000 g water/m$^2$/day, and the air permeability of the membrane is greater than 2 mm/s under the air pressure difference of 300 Pa; after washing 10 times with water, the oil resistance of the membrane surface is at least Grade 4; the moisture permeability of the membrane is greater than 9000 g water/m$^2$/day, and the air permeability of the membrane is greater than 1.5 mm/s under the air pressure difference of 300 Pa.

Preferably, the thickness of the high-moisture-permeability fluorine-containing super-oleophobic microporous membrane is about 0.01-0.08 mm; the membrane weight is about 3-30 g/m$^2$; the porosity is about 70~90%; the initial oil resistance of the membrane surface is at least Grade 6; the tensile strength of the membrane is greater than 30 MPa; after washing 10 times with water, the oil resistance of the membrane surface is at least Grade 5; the moisture permeability of the membrane is greater than 10000 g water/m²/day, and the air permeability of the membrane is greater than 2 mm/s under the air pressure difference of 300 Pa.

Preferably, wherein: the high molecular weight polytetrafluoroethylene dispersion resin is an ultra-high molecular weight polytetrafluoroethylene homopolymer or copolymer dispersion resin, with a standard specific gravity between 2.135 and 2.165 and a melting point between 325° C. and 350° C.; the fluorine-containing ion exchange resin is a fluorine-containing anion exchange resin and/or a fluorine-containing cation exchange resin and/or a fluorine-containing double ion exchange resin and/or a mixture thereof; the polymer side chain of the fluorine-containing ion exchange resin contains ion exchange functional groups, including but not limited to: fluorine-containing sulfonic acid resin, fluorine-containing carboxylic acid resin, fluorine-containing phosphoric acid resin, fluorine-containing tertiary amine resin, fluorine-containing quaternary amine resin, and the mixtures thereof; the chemical composition of the fluorine-containing ion exchange resin contains one or more fluorine-containing monomers selected from tetrafluoroethylene, vinylidene fluoride, trifluoroethylene, trifluorochloroethylene, and fluoroethylene.

Preferably, an average molecular weight of the fluorine-containing alkyl acrylate monomer or fluorine-containing alkyl methacrylate monomer or its mixed monomers is less than 2000, including but not limited to: perfluorobutyl ethyl acrylate, perfluorobutyl ethyl methacrylate, perfluorohexyl ethyl acrylate, perfluorohexyl ethyl methacrylate, perfluorooctyl ethyl acrylate, perfluorooctyl ethyl methacrylate, N-Methyl perfluorobutane sulfonate amine ethyl acrylate, N-Methyl perfluorobutane sulfonate amine ethyl methacrylate, N-Methyl perfluorohexyl sulfonate amine ethyl acrylate, N-methylperfluorohexyl sulfonate aminoethyl methacrylate, N-Methyl perfluorooctane sulfonate amine ethyl acrylate, N-Methyl perfluorooctane sulfonate ammonium ethyl methacrylate, and other acrylates or methacrylates containing fluorine-containing alkyl groups (from C5 to C16).

Preferably, the molecular weight of the urethane acrylate prepolymer or the fluorine-free alkyl acrylate or the mixture thereof is less than 5000, and its melting point is below 50° C.

Preferably, the raw materials of the urethane acrylate prepolymer are selected from: aromatic diisocyanate or aliphatic diisocyanate or 2- to 3-membered isocyanate; polyol, selected from polyethylene glycol, polypropylene glycol, polytetramethylene glycol, poly ester polyol, polycarbonate polyol; wherein: the molecular weight of the polyol is between 600 and 5000, and each molecule contains 2 to 3 hydroxyl groups.

Preferably, the molecular weight of the polyol is between 1000 and 3000.

Preferably, the fluorine-free alkyl acrylate is a free-radical polymerizable monomer or its mixed monomer, its average molecular weight is less than 1000, its melting point is below 80° C., and its normal pressure boiling point is above 160° C., including but not limited to: hydroxyalkyl acrylate, hydroxyalkyl methacrylate, C5-C20 alkyl acrylate, C4-C20 alkyl methacrylate, and C6-C20 acid vinyl ester; wherein, hydroxyalkyl acrylate and hydroxyalkyl methacrylate, including but not limited to: hydroxyethyl acrylate, hydroxyethyl methacrylate, hydroxypropyl acrylate, hydroxypropyl methacrylate.

Preferably, the average molecular weight of the fluorine-free alkyl acrylate is less than 600, and the melting point is below 50° C.

Preferably, when C is a mixture of polyurethane acrylate prepolymer and fluorine-free alkyl acrylate, the weight ratio is: 0% to 70% of polyurethane acrylate prepolymer; 30% to 100% of fluorine-free alkyl acrylic acid ester monomer.

Due to the adoption of the above technical solutions, the high-moisture-permeability fluorine-containing super-oleophobic microporous membrane of the present application simplifies the processing technology, does not need to add flammable and explosive lubricating oil, and its processing technology has high safety. In a mixture of the tetrafluoroethylene dispersion resin and the fluorine-containing ion exchange resin, the additives added can be free radically polymerized at high temperature to become a part of the polymer microporous membrane, and there is no industrial safety problem caused by the three wastes.

DETAILED DESCRIPTION OF THE INVENTION

The technical solution of the present invention will be further specifically described below through the examples in conjunction with the attached drawings.

1. Preparation of a Mixture of Tetrafluoroethylene Dispersion Resin and Fluorine-Containing Ion Exchange Resin, that is, A.

1.1 The Manufacture of Tetrafluoroethylene Copolymerized Dispersion Resin a1: Repeating According to Example 1 of Application No.: 201710471962.9.

1.2 The preparation of fluorine-containing ion exchange resin a2: repeating according to Example 1 of Application No.: 201710251601.3. And the obtained fluorine-containing ion exchange resin is dissolved in 75% medical ethanol aqueous solution and heated at 60 degrees to obtain an alcohol solution of fluorine-containing ion exchange resin with a fixed content of about 20%.

1.3 Mixing the tetrafluoroethylene copolymer dispersion resin a1 with the fluorine-containing ion exchange resin a2 solution for about half an hour in a gentle and non-shearing manner to obtain a special white mixture of fluorine-containing polymers and put it in a vacuum oven at 50 degrees for 12 hours, to remove ethanol water content. Wherein, a dry weight ratio of a1 and a2 (that is, the dry weight ratio of fluorine-containing ion exchange resin/high molecular weight polytetrafluoroethylene dispersion resin) is:

A-0: a2/a1=0

A-1: a2/a1=0.5%

A-2: a2/a1=5%

A-3: a2/a1=10%

A-4: a2/a1=15%

2. Preparation of a Mixture of Urethane Acrylate Prepolymer and Fluorine-Free Alkyl Acrylate, that is, C.

2.1 Preparation of Urethane Acrylate Prepolymer c1

In a reactor with an internal volume of about 200 liters, the jacket is first heated to 100° C., the reactor is vacuumed and dehumidified with nitrogen, and 26.2 kg (containing about 200 moles of NCO isocyanate) 4,4'-Dicyclohexylmethane diisocyanate HMDI is added, start stirring, the temperature in the reactor rises to about 100° C., then 60 kg (containing about 60 moles of —OH groups) of polypropylene glycol (molecular weight about 2000) is added into the reactor, react for about 90 minutes, 18.2 Kg (containing about 140 mol of —OH groups) of hydroxyethyl methacrylate is added, the temperature in the reactor is maintained at about 100° C. for the reaction about one hour, and the polyurethane prepolymer c1 with viscous liquid is obtained. It is liquid at 50° C. after cooling, indicating that the melting point is lower than 50° C.

2.2 Preparation of Mixture C of Urethane Acrylate Prepolymer c1 and Fluorine-Free Alkyl Acrylate c2.

C-0: in a mixing tank with an internal volume of about 100 liters, 15 kg of the polyurethane prepolymer made in Example 2 is added under normal temperature and pressure, and then 35 kg of isodecyl acrylate (CAS: 1330-61-6) is added, stir continuously to form a homogeneous phase, stop stirring, and discharge the mixture to obtain a mixture of polyurethane acrylate prepolymer and fluorine-free alkyl acrylate with a weight ratio of 3:7.

C-1: in a mixing tank with an internal volume of about 100 liters, 25 kg of the polyurethane prepolymer made in Example 2 is added under normal temperature and pressure, and then 25 kg of isodecyl acrylate (CAS: 1330-61-6) is added, stir continuously to form a homogeneous phase, stop stirring, and discharge the mixture to obtain a mixture of polyurethane acrylate prepolymer and fluorine-free alkyl acrylate with a weight ratio of 5:5.

3. Preparation of a White Opaque Mixture of Fluorine-Containing Polymers.

3.1 Preparation of a White Opaque Mixture of Fluorine-Containing Polymers 3-0.

A-0, perfluoroalkyl ethyl acrylate mixture B-1 (average molecular weight less than 1000, melting point less than 35° C., distribution of perfluoroalkyl groups is about C4: 10%, C6: 30%, C8: 50%, C10: 10%), C-0, and high-temperature free radical initiator D: cumene hydroperoxide (CAS: 80-15-9), with a weight ratio of (A:B:C:D)=(75:10:14:1), using a mild and non-shearing manner to mix for about half an hour to obtain a special white mixture of fluorine-containing polymers. The standard specific gravity of the fluorine-containing polymer mixture is about 1.89 g/cm$^3$.

3.2 Preparation of a White Opaque Mixture of Fluorine-Containing Polymers 3-1.

A-2, B-1 (average molecular weight less than 1000, melting point less than 35° C., distribution of perfluoroalkyl groups is about C4: 10%, C6: 30%, C8: 50%, C10: 10%), C-0, and high-temperature free radical initiator D: cumene hydroperoxide (CAS: 80-15-9), with a weight ratio of (A:B:C:D)=(75:10:14:1), using a mild and non-shearing manner to mix for about half an hour to obtain a special white mixture of fluorine-containing polymers. The standard specific gravity of the fluorine-containing polymer mixture is about 1.88 g/cm$^3$.

3.3 Preparation of a White Opaque Mixture of Fluorine-Containing Polymers 3-2.

A-0, B-2 (average molecular weight less than 1000, melting point less than 30° C., distribution of perfluoroalkyl groups is about C4: 10%, C6: 30%, C8: 30%), and high-temperature free radical initiator D: cumene hydroperoxide (CAS: 80-15-9), with a weight ratio of (A:B:C:D)=(85:14: 0:1), using a mild and non-shearing manner to mix for about half an hour to obtain a special white mixture of fluorine-containing polymer. The standard specific gravity of the fluorine-containing polymer mixture is about 2.04 g/cm$^3$.

3.4 Preparation of a White Opaque Mixture of Fluorine-Containing Polymers 3-3

A-1, B-2 (average molecular weight less than 1000, melting point less than 30° C., distribution of perfluoroalkyl groups is about C4: 10%, C6: 60%, C8: 30%), and high-temperature free radical initiator D: cumene hydroperoxide (CAS: 80-15-9), with a weight ratio of (A:B:C:D)=(85:14: 0:1), using a mild and non-shearing manner to mix for about half an hour to obtain a special white mixture of fluorine-containing polymers. The standard specific gravity of the fluorine-containing polymer mixture is about 2.03 g/cm$^3$.

3.5 Preparation of a White Opaque Mixture of Fluorine-Containing Polymers 3-4.

A-3, B-2 (average molecular weight less than 1000, melting point less than 30° C., distribution of perfluoroalkyl groups is about C4: 10%, C6: 60%, C8: 30%), and high-temperature free radical initiator D: cumene hydroperoxide (CAS: 80-15-9), with a weight ratio of (A:B:C:D)=(85:14: 0:1), using a mild and non-shearing manner to mix for about half an hour to obtain a special white mixture of fluorine-containing polymers. The standard specific gravity of the fluorine-containing polymer mixture is about 2.02 g/cm$^3$.

3.6 Preparation of a White Opaque Mixture of Fluorine-Containing Polymers 3-5.

A-2, B-1 (average molecular weight less than 1000, melting point less than 35° C., distribution of perfluoroalkyl groups is about C4: 10%, C6: 30%, C8: 50%, C10:10%), C-1, and high-temperature free radical initiator D: cumene hydroperoxide (CAS: 80-15-9), with a weight ratio of (A:B: C:D)=(65:11:23:1), using a mild and non-shearing manner to mix for about half an hour to obtain a special white mixture of fluorine-containing polymer. The standard specific gravity of the fluorine-containing polymer mixture is about 1.84 g/cm$^3$.

3.7 Preparation of a White Opaque Mixture of Fluorine-Containing Polymers 3-6.

A-2, B-1 (average molecular weight less than 1000, melting point less than 35° C., distribution of perfluoroalkyl groups is about C4: 10%, C6: 30%, C8: 50%, C10:10%), C-2, and high-temperature free radical initiator D: cumene hydroperoxide (CAS: 80-15-9), with a weight ratio of (A:B: C:D)=(65:11:23:1), using a mild and non-shearing manner to mix for about half an hour to obtain a special white mixture of fluorine-containing polymers. The standard specific gravity of the fluorine-containing polymer mixture is about 1.83 g/cm$^3$.

3.8 Preparation of a White Opaque Mixture of Fluorine-Containing Polymers 3-7.

A-2, B-2 (average molecular weight less than 1000, melting point less than 30° C., distribution of perfluoroalkyl groups is about C4: 10%, C6: 60%, C8: 30%), C-3 (select isodecyl acrylate, CAS: 1330-61-6), and high-temperature free radical initiator D: cumene hydroperoxide (CAS: 80-15-9), with a weight ratio of (A:B:C:D)=(78:10:11:1), using a mild and non-shearing manner to mix for about half an hour to obtain a special white mixture of fluorine-containing polymers. The standard specific gravity of the fluorine-containing polymer mixture is about 1.97 g/cm$^3$.

3.9 Preparation of a White Opaque Mixture of Fluorine-Containing Polymers 3-8.

A-4, B-2 (average molecular weight less than 1000, melting point less than 30° C., distribution of perfluoroalkyl groups is about C4: 10%, C6: 60%, C8: 30%), C-3 (select isodecyl acrylate, CAS: 1330-61-6), and high-temperature free radical initiator D: cumene hydroperoxide (CAS: 80-15-9), with a weight ratio of (A:B:C:D)=(78:10:11:1), using a mild and non-shearing manner to mix for about half an hour to obtain a special white mixture of fluorine-containing polymers. The standard specific gravity of the fluorine-containing polymer mixture is about 1.96 g/cm$^3$.

4. Manufacture and Comparison Results of Fluorine-Containing Microporous Membrane and its Composite Fabrics of the Application.

4.1

3-0 and 3-1 are respectively processed according to the same process as follows: after using non-shear stirring, firstly pre-pressed into a cylindrical paste mixture, and then the paste mixture is extruded into a rod by a pusher at about 70° C., and calendered into a strip shape with a thickness of about 0.45 mm and a width of about 180 mm. The dry strip is rapidly stretched longitudinally about 4 times at a temperature of about 130° C., then rapidly stretched transversely about 12 times at a high temperature of about 180° C., and finally shaping at a high temperature of about 370° for about 11 seconds, a fluorine-containing super-oleophobic microporous membrane is obtained. Membrane made with material 3-0 is labeled as 4-0; membrane made with material 3-1 is labeled as 4-1.

After testing, the thickness of 4-0 is about 0.036 mm, the width is about 1800 mm, the membrane weight is about 15 g/m$^2$, the porosity is about 80-83%, the tensile strength of the membrane is greater than 20 MPa, and the air permeability is about 3.6 mm/s under 300 Pa air pressure, the moisture permeability (calcium chloride, positive cup method) is about 8000 g of water/m$^2$/day.

The thickness of 4-1 is about 0.037 mm, the width is about 1800 mm, the membrane weight is about 15 g/m$^2$, the porosity is about 82-85%, the tensile strength of the membrane is greater than 20 MPa, and the air permeability is about 3.9 mm/s under 300 Pa air pressure, the moisture permeability (calcium chloride, positive cup method) is about 11000 g of water/m$^2$/day.

4-0 and 4-1 were respectively combined with nylon 6 plain weave fabric (96 g/m$^2$) through dotted polyurethane glue points to compound the membrane and cloth to obtain composite fabrics 5-0 and 5-1. And test: composite fabric 5-0, the initial water pressure resistance is greater than 200 kPa, after washing 10 times with water, the water pressure resistance is still greater than 100 kPa; the initial oil resistance of the membrane surface is Grade 7, after washing 10 times with water, the oil resistance of the membrane surface is still Grade 6; the air permeability of composite fabric is about 2.8 mm/s under 300 Pa air pressure; the moisture permeability (calcium chloride, positive cup method) is about 7000 g of water/m$^2$/day; the sealing effect of the sealing strip on the seam line is good, but the moisture permeability is still poor; in comparison, the composite fabric 5-1, the initial water pressure resistance is greater than 200 kPa, after washing 10 times with water, the water pressure resistance is still greater than 100 kPa; the initial oil resistance of the membrane surface is Grade 7, and after washing 10 times with water, the oil resistance of the membrane surface is still Grade 6; the air permeability of the composite fabric is about 3.2 mm/s under 300 Pa air pressure; the moisture permeability (calcium chloride, positive cup method) is about 9500 g of water/m$^2$/day; the sealing effect of the sealing strip is good. All performance indicators meet the standards for waterproof and breathable clothing fabrics.

Conclusion 1: it can be seen that the moisture permeability of membrane 4-1 with a fluorine-containing ion exchange resin is better than that of membrane 4-0 without an ion exchange resin, and other properties are qualified, and it is found that adding a fluorine-containing ion exchange resin does not reduce the waterproof function of the membrane fabric and can fully meet the application requirements.

4.2

Examples 3-2, 3-3 and 3-4 are respectively processed according to the same process as follows: after using non-shear stirring, firstly pre-pressed into a cylindrical paste mixture, and then the paste mixture is extruded into a rod by a pusher at about 70° C., and calendered into a strip shape with a thickness of about 0.45 mm and a width of about 180 mm. The dry strip is rapidly stretched longitudinally about 4 times at a temperature of about 140° C., then rapidly stretched transversely about 12 times at a high temperature of about 190° C., and finally shaping at a high temperature of about 370° for about 11 seconds, a fluorine-containing super-oleophobic microporous membrane is obtained. Membrane made with material 3-2 is labeled as 4-2; membrane made with material 3-3 is labeled as 4-3, and membrane made with material 3-4 is labeled as 4-4.

After testing, the thickness of 4-2 is about 0.031 mm, the width is about 1800 mm, the membrane weight is about 15 g/m$^2$, the porosity is about 86-89%, the tensile strength of the membrane is greater than 25 MPa, and the air permeability is about 4.6 mm/s under 300 Pa air pressure, the moisture permeability (calcium chloride, positive cup method) is about 8500 g of water/m$^2$/day. The thickness of 4-3 is about 0.031 mm, the width is about 1800 mm, the membrane weight is about 15 g/m$^2$, the porosity is about 86-89%, the tensile strength of the membrane is greater than 25 MPa, and the air permeability is about 4.8 mm/s under 300 Pa air pressure, the moisture permeability (calcium chloride, positive cup method) is about 9200 g of water/m$^2$/day. The thickness of 4-4 is about 0.030 mm, the width is about 1800 mm, the membrane weight is about 15 g/m$^2$, the porosity is about 88-90%, the tensile strength of the membrane is greater than 25 MPa, and the air permeability is about 5.6 mm/s under 300 Pa air pressure, the moisture permeability (calcium chloride, positive cup method) is about 13500 g of water/m$^2$/day. 4-2, 4-3 and 4-4 were respectively combined with nylon 6 plain weave fabric (96 g/m$^2$) through dotted polyurethane glue points to compound the membrane and cloth to obtain composite fabrics 5-2, 5-3 and 5-4. And test: composite fabric 5-2, the initial water pressure resistance is greater than 200 kPa, after washing 10 times with water, the water pressure resistance is still greater than 150 kPa; the initial oil resistance of the membrane surface is Grade 8, after washing 10 times with water, the oil resistance of the membrane surface is still Grade 7; the air permeability of composite fabric is about 4.1 mm/s under 300 Pa air pressure; the moisture permeability (calcium chloride, positive cup method) is about 7500 g of water/m$^2$/day; the sealing effect of the sealing strip on the seam line is good.

In comparison, the initial water pressure resistance of the composite fabric 5-3 is greater than 200 kPa, after washing 10 times with water, the water pressure resistance is still greater than 150 kPa; the initial oil resistance of the membrane surface is Grade 8, and after washing 10 times with water, the oil resistance of the membrane surface is still Grade 7; the air permeability of the composite fabric is about 4.3 mm/s under 300 Pa air pressure; the moisture permeability (calcium chloride, positive cup method) is about 8300 g of water/m$^2$/day; the sealing effect of the sealing strip is good. All performance indicators meet the standards for waterproof and breathable clothing fabrics.

The initial water pressure resistance of the composite fabric 5-4 is greater than 200 kPa, after washing 10 times with water, the water pressure resistance is still greater than 150 kPa; the initial oil resistance of the membrane surface is Grade 8, after washing 10 times with water, the oil resistance of the membrane surface is still Grade 7; the air permeability of the composite fabric is about 5.1 mm/s under 300 Pa air pressure; the moisture permeability (calcium chloride, positive cup method) is about 12500 g of water/m$^2$/day; the sealing effect of the sealing strip is good. All performance indicators meet the standards for waterproof and breathable clothing fabrics.

Conclusion 2: it can be seen that the moisture permeability of membranes 4-3 and 4-4 with a fluorine-containing ion exchange resin are better than that of membrane 4-2 without an ion exchange resin, and other properties are qualified, and adding a fluorine-containing ion exchange resin does not reduce the waterproof function of the membrane fabric and can fully meet the application requirements.

4.3

3-5 and 3-6 are respectively processed according to the same process as follows: after using non-shear stirring, firstly pre-pressed into a cylindrical paste mixture, and then the paste mixture is extruded into a rod by a pusher at about 70° C., and calendered into a strip shape with a thickness of about 0.45 mm and a width of about 180 mm. The dry strip is rapidly stretched longitudinally about 4 times at a temperature of about 130° C., then rapidly stretched transversely about 12 times at a high temperature of about 190° C., and finally shaping at a high temperature of about 370° for about 11 seconds, a fluorine-containing super-oleophobic microporous membrane is obtained. Membrane made with material 3-5 is labeled as 4-5; Membrane made with material 3-6 is labeled as 4-6.

After testing, the thickness of 4-5 is about 0.039 mm, the width is about 1800 mm, the membrane weight is about 16 g/m$^2$, the porosity is about 76~80%, and the air permeability is about 3.3 mm/s under 300 Pa air pressure, the moisture permeability (calcium chloride, positive cup method) is about 7600 g of water/m$^2$/day.

The thickness of 4-6 is about 0.038 mm, the width is about 1800 mm, the membrane weight is about 16 g/m$^2$, the porosity is about 79~82%, and the air permeability is about 3.8 mm/s under 300 Pa air pressure, the moisture permeability (calcium chloride, positive cup method) is about 10500 g of water/m$^2$/day.

4-5 and 4-6 were respectively combined with nylon 6 plain weave fabric (96 g/m$^2$) through dotted polyurethane glue points to compound the membrane and cloth to obtain composite fabrics 5-5 and 5-6. And test: the initial water pressure resistance of composite fabric 5-5 is greater than 200 kPa, after washing 10 times with water, the water pressure resistance is still greater than 100 kPa; the initial oil resistance of the membrane surface is Grade 7, after washing 10 times with water, the oil resistance of the membrane surface is still Grade 5; the tensile strength of membrane is greater than 20 MPa, the air permeability of composite fabric is about 2.9 mm/s under 300 Pa air pressure; the moisture permeability (calcium chloride, positive cup method) is about 6800 g of water/m$^2$/day; the sealing effect of the sealing strip on the seam line is good.

In comparison, the initial water pressure resistance of the composite fabric 5-6 is greater than 200 kPa, after washing 10 times with water, the water pressure resistance is still greater than 100 kPa; the initial oil resistance of the membrane surface is Grade 7, and after washing 10 times with water, the oil resistance of the membrane surface is still Grade 5; the tensile strength of membrane is greater than 20 MPa, the air permeability of the composite fabric is about 3.5 mm/s under 300 Pa air pressure; the moisture permeability (calcium chloride, positive cup method) is about 9600 g of water/m$^2$/day; the sealing effect of the sealing strip is good and all performance indicators meet the standards for waterproof and breathable clothing fabrics.

Conclusion 3: it can be seen that the moisture permeability of 5-6 with a fluorine-containing ion exchange resin is better than that of 5-5 without an ion exchange resin, other properties are qualified, and adding an fluorine-containing ion exchange resin does not reduce the waterproof function of the membrane fabric and can fully meet the application requirements.

4.4

3-7 and 3-8 are respectively processed according to the same process as follows: after using non-shear stirring, firstly pre-pressed into a cylindrical paste mixture, and then the paste mixture is extruded into a rod by a pusher at about 70° C., and calendered into a strip shape with a thickness of about 0.45 mm and a width of about 180 mm. The dry strip is rapidly stretched longitudinally about 4 times at a temperature of about 140° C., then rapidly stretched transversely about 12 times at a high temperature of about 190° C., and finally shaping at a high temperature of about 370° for about 12 seconds, a fluorine-containing super-oleophobic microporous membrane is obtained. Membrane made with material 3-7 is labeled as 4-7; membrane made with material 3-8 is labeled as 4-8.

After testing, the thickness of 4-7 is about 0.032 mm, the width is about 1800 mm, the membrane weight is about 15 g/m$^2$, the porosity is about 86~89%, the tensile strength of the membrane is greater than 20 MPa, and the air permeability is about 5.2 mm/s under 300 Pa air pressure, the moisture permeability (calcium chloride, positive cup method) is about 12000 g of water/m$^2$/day.

The thickness of 4-8 is about 0.030 mm, the width is about 1800 mm, the membrane weight is about 16 g/m$^2$, the porosity is about 79~82%, and the air permeability is about 6.8 mm/s under 300 Pa air pressure, the moisture permeability (calcium chloride, positive cup method) is about 15000 g of water/m$^2$/day.

4-7 and 4-8 were respectively combined with nylon 6 plain weave fabric (96 g/m$^2$) through dotted polyurethane glue points to compound the membrane and cloth to obtain composite fabrics 5-7 and 5-8. And test: composite fabric 5-7, the initial water pressure resistance is greater than 200 kPa, after washing 10 times with water, the water pressure resistance is still greater than 100 kPa; the initial oil resistance of the membrane surface is Grade 7, after washing 10 times with water, the oil resistance of the membrane surface is still Grade 6; the air permeability of composite fabric is about 4.8 mm/s under 300 Pa air pressure; the moisture permeability (calcium chloride, positive cup method) is about 11000 g of water/m$^2$/day. The sealing effect of the sealing strip is good and all performance indicators meet the standards for waterproof and breathable clothing fabrics.

In comparison, the initial water pressure resistance of the composite fabric 5-8 is less than 200 kPa, after washing 10 times with water, the water pressure resistance is still less than 100 kPa; the initial oil resistance of the membrane surface is Grade 7, and after washing 10 times with water, the oil resistance of the membrane surface is still Grade 6; the air permeability of the composite fabric is about 6.1 mm/s under 300 Pa air pressure; the moisture permeability (calcium chloride, positive cup method) is about 13500 g of water/m$^2$/day. The sealing effect of the sealing strip is good, although the air permeability and moisture permeability are extremely excellent, its water pressure resistance performance does not meet the standards for waterproof and breathable clothing fabrics.

Conclusion 4: it can be seen that although the moisture permeability of 4-8 with excessive fluorine-containing ion exchange resin is more excellent, the waterproof function is negatively affected. Only 4-7, with the content of the fluorine-containing ion exchange resin is in the normal recommended range of the present invention, the moisture permeability and waterproof function can be taken into account.

In summary, the following conclusions are drawn: the present invention finds that the high-moisture-permeability fluorine-containing super-oleophobic microporous membrane of the present application, first mixing a high molecular weight polytetrafluoroethylene dispersion resin and a fluorine-containing ion exchange resin, and then mixing with a fluorine-containing Alkyl acrylate monomer (molecular weight less than 3000), optionally, an urethane acrylate prepolymer or a fluorine-free alkyl acrylate or its mixture are added, and a high-temperature free radical initiator is added, uniformly blended in sequence; all the mixture obtained does not need to add flammable and explosive lubricating oil and it can be directly extruded into a paste, pressed into a strip, stretched in one direction or two directions, and shaped to obtain a high-moisture-permeability fluorine-containing ultra-thin membrane with better protection function. Its processing technology has high safety, no three wastes, and membrane products have high waterproof, oil resistance, washable performance and stain resistance.

The examples described above are only for illustrating the present invention and are not intended to limit the scope of the present invention. All equivalent changes and modifications made by those skilled in the art to the present invention shall fall within the scope of the attached claims of the present invention.

What is claimed is:

1. A preparation method of a high-moisture-permeability fluorine-containing super-oleophobic microporous membrane, the preparation method comprises the following steps:

(1) preparing a white opaque mixture of fluorine-containing polymers: adding the materials in sequence according to a weight ratio of A:B:C:D of 65%-80%:6%-15%: 2%-23%:0-2%, stirring and mixing uniformly in a non-shear manner, and subjecting the white opaque mixture of fluorine-containing polymers to a vacuum drying at 50° C. for at least 12 hours; wherein:

A is a blend of a high molecular weight polytetrafluoroethylene dispersion resin and a fluorine-containing ion exchange resin, wherein the fluorine-containing ion exchange resin comprises one or more fluorine-containing monomers selected from tetrafluoroethylene, vinylidene fluoride, trifluoroethylene, trifluorochloroethylene, and fluoroethylene, and further comprises at least one ion-exchange functional group selected from sulfonic acid, carboxylic acid, phosphoric acid, tertiary amine, or quaternary amine; wherein a dry weight ratio of fluorine-containing ion exchange resin to the high molecular weight polytetrafluoroethylene dispersion resin is 0.5%-10%;

B is a fluorine-containing alkyl acrylate monomer, or a fluorine-containing alkyl methacrylate monomer, or a mixture of monomers thereof; its molecular weight is less than 3000, and its melting point is below 80° C.;

C is a polyurethane acrylate prepolymer, or a fluorine-free alkyl acrylate monomer, or a mixture thereof; its molecular weight is less than 8000, and its melting point is below 80° C.;

D is a high temperature free radical initiator;

(2) pouring the white opaque mixture of fluorine-containing polymers directly into a blank pressing column barrel, and press the blank at 20° C. to 100° C. after air-exhausting to make a cylindrical pasty mixture blank column;

(3) extruding the pasty mixture blank column through a pusher at 20° C.-100° forming a pasty extrudate, and then calendering the pasty extrudate into strips with a thickness of 50-2000 microns;

(4) stretching the strips unidirectionally or biaxially at 100° C. to 200° C., and finally thermally shaping at 200° C. to 390° C. to make the high-moisture-permeability fluorine-containing super-oleophobic microporous membrane.

2. The preparation method of the high-moisture-permeability fluorine-containing super-oleophobic microporous membrane according to claim 1, wherein a thickness of the high-moisture-permeability fluorine-containing super-oleophobic microporous membrane is about 0.005-1.5 mm; the membrane weight is about 1-1200 g/m$^2$; a porosity is about 30-95%; an initial oil resistance of the membrane surface is at least Grade 5; a tensile strength of the membrane is greater than 20 MPa, a moisture permeability of the membrane is greater than 10,000 g water/m$^2$/day, and an air permeability of the membrane is greater than 2 mm/s under the air pressure difference of 300 Pa; and wherein after washing 10 times with water, the oil resistance of the membrane surface is at least Grade 4; the moisture permeability of the membrane is greater than 9000 g water/m$^2$/day, and the air permeability of the membrane is greater than 1.5 mm/s under the air pressure difference of 300 Pa.

3. The preparation method of the high-moisture-permeability fluorine-containing super-oleophobic microporous membrane according to claim 1, wherein a thickness of the high-moisture-permeability fluorine-containing super-oleophobic microporous membrane is about 0.01-0.08 mm; the membrane weight is about 3-30 g/m$^2$; the porosity is about 70~90%; an initial oil resistance of the membrane surface is at least Grade 6; a tensile strength of the membrane is greater than 30 MPa; and wherein after washing 10 times with water, the oil resistance of the membrane surface is at least Grade 5; the moisture permeability of the membrane is greater than 10000 g water/m$^2$/day, and the air permeability of the membrane is greater than 2 mm/s under the air pressure difference of 300 Pa.

4. The preparation method of the high-moisture-permeability fluorine-containing super-oleophobic microporous membrane according to claim 1, wherein:

the high molecular weight polytetrafluoroethylene dispersion resin is an ultra-high molecular weight polytetrafluoroethylene homopolymer or copolymer dispersion resin, with a standard specific gravity between 2.135 and 2.165 and a melting point between 325° C. and 350° C.; and the fluorine-containing ion exchange resin is selected from one or more of a fluorine-containing anion exchange resin, a fluorine-containing cation exchange resin, and a fluorine-containing double ion exchange resin.

5. The preparation method of the high-moisture-permeability fluorine-containing super-oleophobic microporous membrane according to claim 1, an average molecular weight of the fluorine-containing alkyl acrylate monomer or fluorine-containing alkyl methacrylate monomer or the mixture of monomers thereof is less than 2000, the fluorine-containing alkyl acrylate monomer or fluorine-containing alkyl methacrylate monomer or the mixture of monomers thereof comprises one or more of perfluorobutyl ethyl acrylate, perfluorobutyl ethyl methacrylate, perfluorohexyl ethyl acrylate, perfluorohexyl ethyl methacrylate, perfluorooctyl ethyl acrylate, perfluorooctyl ethyl methacrylate, N-Methyl perfluorobutane sulfonate amine ethyl acrylate, N-Methyl perfluorobutane sulfonate amine ethyl methacrylate, N-Methyl perfluorohexyl sulfonate amine ethyl acrylate, N-methylperfluorohexyl sulfonate aminoethyl methacrylate, N-Methyl perfluorooctane sulfonate amine ethyl acrylate, and N-Methyl perfluorooctane sulfonate ammonium ethyl methacrylate.

6. The preparation method of the high-moisture-permeability fluorine-containing super-oleophobic microporous membrane according to claim 1, wherein the molecular weight of the urethane acrylate prepolymer or the fluorine-free alkyl acrylate or the mixture thereof is less than 5000 and has a melting point is below 50° C.

7. The preparation method of the high-moisture-permeability fluorine-containing super-oleophobic microporous membrane according to claim 6, wherein raw materials of the urethane acrylate prepolymer are selected from aromatic diisocyanate or aliphatic diisocyanate or 2- to 3-membered isocyanate; polyol, selected from polyethylene glycol, polypropylene glycol, polytetramethylene glycol, poly ester polyol, polycarbonate polyol; wherein the molecular weight of the polyol is between 600 and 5000, and each molecule contains 2 to 3 hydroxyl groups.

8. The preparation method of the high-moisture-permeability fluorine-containing super-oleophobic microporous membrane according to claim 7, wherein the raw materials include polyol and the molecular weight of the polyol is between 1000 and 3000.

9. The preparation method of the high-moisture-permeability fluorine-containing super-oleophobic microporous membrane according to claim 6, wherein the fluorine-free alkyl acrylate is a free-radical polymerizable monomer or a mixed monomer thereof having an average molecular weight less than 1000, a melting point below 80° C., and a normal pressure boiling point above 160° C., and comprising one or more selected from hydroxyalkyl acrylate, hydroxyalkyl methacrylate, C5-C20 alkyl acrylate, C4-C20 alkyl methacrylate, and C6-C20 acid vinyl ester; wherein, hydroxyalkyl acrylate and hydroxyalkyl methacrylate comprise one or more selected from hydroxyethyl acrylate, hydroxyethyl methacrylate, hydroxypropyl acrylate, and hydroxypropyl methacrylate.

10. The preparation method of the high-moisture-permeability fluorine-containing super-oleophobic microporous membrane according to claim 9, wherein the average molecular weight of the fluorine-free alkyl acrylate is less than 600, and the melting point is below 50° C.

11. The preparation method of the high-moisture-permeability fluorine-containing super-oleophobic microporous membrane according to claim 1, wherein C is a mixture of polyurethane acrylate prepolymer and fluorine-free alkyl acrylate, and the weight ratio is 0% to 70% of polyurethane acrylate prepolymer to 30% to 100% of fluorine-free alkyl acrylic acid ester monomer.

* * * * *